United States Patent
Kawai

(10) Patent No.: US 6,781,448 B2
(45) Date of Patent: Aug. 24, 2004

(54) METHOD AND APPARATUS FOR DEMODULATING DATA

(75) Inventor: Masahiro Kawai, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 10/375,108

(22) Filed: Feb. 28, 2003

(65) Prior Publication Data

US 2003/0169102 A1 Sep. 11, 2003

(30) Foreign Application Priority Data

Mar. 6, 2002 (JP) .......................................... 2002-59798

(51) Int. Cl.$^7$ .............................................. H03D 3/00
(52) U.S. Cl. ...................... 329/304; 329/309; 375/329; 375/345; 375/298
(58) Field of Search ................................ 329/304, 309; 375/345, 329, 398

(56) References Cited

U.S. PATENT DOCUMENTS 6,483,883 B1 * 11/2002 Iemura ....................... 375/345

* cited by examiner

Primary Examiner—Arnold Kinkead
(74) Attorney, Agent, or Firm—Dickstein, Shapiro, Morin & Oshinsky, LLP.

(57) ABSTRACT

An automatic gain control circuit capable of accurately executing control irrespective of the conditions of control is to be provided. This automatic gain control circuit includes a multiplier, low pass filters, a comparator, first and second absolute value circuits, and a delay circuit. The multiplier multiplies a first quadrature signal Ich by a signal supplied from the low pass filters. The first absolute value circuit figures out the amplitude of the first quadrature signal Ich supplied from the multiplier, and the second absolute value circuit figures out the amplitude of the second quadrature signal Qch. The delay circuit delays the output signal from the second absolute value circuit by at least an equivalent of one symbol. The comparator compares, after the delay circuit delays the output signals, the amplitude of first quadrature signal and the amplitude of second quadrature signal.

11 Claims, 10 Drawing Sheets

RESULT OF DEMODULATION
WHERE THERE IS GAIN
DIFFERENCE IN ANALOG CIRCUITS

POSITIONS OF UNCONTROLLABLE
SIGNAL POINTS

WHEN RECEPTION POINT IS STILL

STATE IN WHICH ABSOLUTE VALUES ARE TAKEN

COMPARISON OF POINTS DIFFERING IN POSITION

WHEN PROJECTION IS ON SAME POINT

METHOD AND APPARATUS FOR DEMODULATING DATA

BACKGROUND OF THE INVENTION

1. Field of the Invention

The present invention relates to a demodulator and a demodulating method using a quasi-synchronous detection.

2. Description of the Related Art

A configuration of a conventional QAM (quadrature amplitude modulation) demodulator 50 is shown in FIG. 1.

The demodulator 50 includes a quadrature detector 1 for converting an intermediate frequency signal (IF), that is an inputted modulated signal, into two quadrature signals Ich and Qch, an oscillator 2 for transmitting periodical signals to the quadrature detector 1, low pass filters 3 and 4 for removing a high frequency component from the output of the quadrature detector 1 and taking out only the required quadrature component signals, amplifiers 5 and 6 for amplifying the quadrature signals Ich and Qch supplied from the low pass filters 3 and 4 to amplitudes large enough for reception by analog-to-digital (A/D) converters, A/D converters 7 and 8 for converting the two analog quadrature signals Ich and Qch into digital signals, an automatic gain control (AGC) circuit 9 for controlling the amplitude of either one of the two quadrature signals Ich and Qch supplied from the A/D converters 7 and 8, a phase-rotator 10 for rotating the phases of the two quadrature signals Ich and Qch supplied from the AGC circuit 9, and amplitude adjustors 11 and 12 for adjusting the amplitudes of the two quadrature signals Ich and Qch supplied from the phase-rotator 10 to prescribed amplitudes.

Supposing that the difference in gains between the two quadrature signals Ich and Qch arising in the analog section (the quadrature detector 1, the low pass filters 3 and 4, the amplifiers 5 and 6, and the A/D converters 7 and 8) is not corrected, the demodulated output will be affected and signal points around will expand as shown in FIG. 2, inviting a deterioration in error rate characteristic.

In order to prevent this, the demodulator 50 shown in FIG. 1 is provided with the AGC circuit 9. This AGC circuit 9 detects the relative amplitude levels of the two quadrature signals Ich and Qch, and cancels the gain difference arising in the analog section by controlling the amplitude of the quadrature signal Ich according to the result of detection.

A first typical configuration 9A of the AGC circuit 9 is shown in FIG. 3.

The AGC circuit 9A shown in FIG. 3 consists of a multiplier 27, a low pass filter 28, a comparator 29 and first and second absolute value circuits 30 and 31.

The first absolute value circuit 30 figures out the absolute value, i.e. the amplitude, of the quadrature signal Ich, and the second absolute value circuit 31 figures out the absolute value, i.e. the amplitude, of the quadrature signal Qch. The amplitudes of the two quadrature signals Ich and Qch figured out by the first and second absolute value circuits 30 and 31 are outputted to the comparator 29, which compares these two amplitudes. The low pass filter 28 integrates signals indicating the result of comparison, supplied by the comparator 29, into a control signal and transmits this control signal to the multiplier 27. The multiplier 27 corrects the quadrature signal Ich by multiplying the quadrature signal Ich by this control signal.

However, this involves the following problem.

The problem with this AGC circuit 9A is that it cannot exercise proper control if receive signals are under specific conditions.

This problem arises because, in the AGC circuit 9A, the comparator 29 compares the quadrature signals Ich and Qch at the same point of time. In a PSK operation or a QAM operation, the two quadrature signals Ich and Qch cannot take respectively independent values, therefore once the value of the quadrature signal Ich is determined, the value of the other quadrature signal Qch is restricted to a prescribed range.

Supposing a QPSK operation, the values of the two quadrature signals Ich and Qch before the phase-rotator 10 are shown in FIG. 4. Thus, the values that the quadrature signals Ich and Qch are limited to those on a circle 60 when the gain of the quadrature signal Ich is equal to that of the quadrature signal Qch, or to those on an oval 61 when the gain of the quadrature signal Ich is greater than that of the quadrature signal Qch.

In such a situation, comparing the amplitudes of the two quadrature signals Ich and Qch at the same point of time is equivalent to finding out which of areas A and B, having |Ich−Qch|=0 on the border between them, input signals will enter. In area A the amplitude of Ich is greater than that of Qch, while in area B the amplitude of Qch is greater than that of Ich.

Here is supposed a case in which the reception point is in a position shown in FIG. 5.

If there is no difference in gain by the analog circuits between the two quadrature signals Ich and Qch, the numbers of signal points entering into area A will be equal to those of signal points entering into area B, therefore no control will be performed.

If the gain of Ich is greater than that of Qch, signal points will enter into area A, and control will be performed for reducing the gain of Ich.

If, conversely, the gain of Qch is greater than that of Ich, signal points will enter into area B, and control will be performed for raising the gain of Ich.

Thus, as shown in FIG. 5, if the reception points are in the vicinity of straight lines I=±Q, control will be performed correctly.

However, when receive signals come in the positions shown in FIG. 6, if data are equally distributed among four areas which are divided by two straight lines I=±Q, the numbers of signal points entering into areas A and B will be equal. Therefore, even if there is an amplitude difference between Ich and Qch, no control will be performed.

As described above, the problem with the AGC circuit 9A shown in FIG. 3 is that sometimes control is not performed correctly because the signals Ich and Qch at the same point of time are not independent each other.

In this connection, AGC circuits to solve this problem are also proposed. An AGC circuit 9B shown in FIG. 7 is one of them.

This AGC circuit 9B includes a multiplier 32, a low pass filter 33, a comparator 34, first and second averaging circuits 35 and 36, and first and second absolute value circuits 37 and 38.

As will be described below, this AGC circuit 9B is so configured that it passes no judgment merely on the basis of a single symbol, but averages a certain number of signal points and controls on the basis of the average thereby obtained.

The first and second absolute value circuits 37 and 38 figure out respective amplitudes of the two quadrature signals Ich and Qch, and transmit the amplitudes figured out to the first and second averaging circuits 35 and 36, respectively.

Each of the first and second averaging circuits 35 and 36, upon receiving predetermined numbers of amplitudes, averages them and transmits the respective average amplitudes to the comparator 34.

The comparator 34 compares these two averages. The low pass filter 33 integrates signals indicating the result of comparison, supplied from the comparator 34, into a control signal, and transmits this control signal to the multiplier 32. The multiplier 32 corrects the quadrature signal Ich by multiplying the quadrature signal Ich by this control signal.

The AGC circuit 9B, as it can obtain amplitude information on the two quadrature signals Ich and Qch, can perform proper control in any situation.

However, if a circuit to supply N averages per symbol is to be configured for speeding up a control, all the values of N past inputs will have to be stored. If a large N value is set to improve the accuracy, the storage will be correspondingly increased. Therefore the scale of circuit will be vastly large.

FIG. 8 is a block diagram of another demodulator 51 according to the prior art.

The demodulator 51 shown in FIG. 8 includes a first AGC circuit 39 into which the two quadrature signals Ich and Qch are inputted, a converter 40, a phase-rotator 41, an NCO 42, a second AGC circuit 43, a third AGC circuit 44 and a detecting circuit 45.

The first AGC circuit 39 controls the amplitude of either one of the two quadrature signals Ich and Qch, and the phase-rotator 41 rotates the phases of the two quadrature signals Ich and Qch supplied from the first AGC circuit 39. The second AGC circuit 43 and the third AGC circuit 44 adjust the amplitudes of the two quadrature signals Ich and Qch supplied from the phase-rotator 41 to prescribed amplitudes.

Regarding signal points supplied from the second AGC circuit 43 and the third AGC circuit 44 the detecting circuit 45 detects deviations from the grid points where the receive signal points should be normally placed, and extracts components due to the gain difference between the two quadrature signals Ich and Qch out of those deviations, and delivers those components to the converter 40. The converter 40 rotates the two quadrature signals in the reverse direction to the rotation by the phase-rotator 41 to return them to their respective states before the phase rotation, and supplies the quadrature signals after this reverse rotation to the first AGC circuit 39 as the control signals.

In this configuration, another control circuit may be additionally inserted into a feedback circuit consisting of the first AGC circuit 39, the phase-rotator 41, the second AGC circuit 43, the third AGC circuit 44, the detecting circuit 45 and the converter 40, but in such a case the control may be prevented from being properly performed by interference between the newly added control circuit and the feedback circuit.

SUMMARY OF THE INVENTION

An object of the invention is to solve the above-noted problems of demodulators according to the prior art.

Therefore the present invention provides an AGC circuit and an AGC method which are controlled correctly in any situation without having a control by the use of averages or signals after phase rotation or having a comparision of the two quadrature signals Ich and Qch at the same point of time.

In order to achieve this object, the present invention provides an AGC circuit for digital wireless communication systems using a quadrature modulation, which compares the amplitudes of two inputted quadrature signals at mutually different points of time and, if there is a difference between those amplitudes, corrects the difference.

Further the present invention provides an AGC circuit having a multiplier, a low pass filter, a comparator, first and second absolute value circuits, and a delay circuit, wherein the multiplier multiplies a first quadrature signal by a signal supplied from the low pass filter, the first absolute value circuit figures out the amplitude of the signal supplied from the multiplier, the second absolute value circuit figures out the amplitude of a second quadrature signal, the delay circuit delays the output signal from the first absolute value circuit or the output signal from the second absolute value circuit by at least an equivalent of one symbol, the comparator compares the amplitude of the first quadrature signal and the amplitude of the second quadrature signal after the output signal is delayed by the delay circuit, and the low pass filter removes high frequency components from the output signal of the comparator.

The delay circuit can be configured of, for instance, a flip-flop circuit.

The low pass filter is provided with an up-down counter, which preferably should count up or down its count according to the output from the comparator.

The AGC circuit described above can be applied to, for instance, demodulators.

A typical configuration of such a demodulator may include a quadrature detector for converting entered intermediate frequency signals of a modulated wave into first and second quadrature signals; an analog-to-digital converter for converting the first and second quadrature signals, which are analog signals, into digital signals; an AGC circuit for comparing at mutually different points of time the amplitudes of first and second quadrature signals supplied from the analog-to-digital converter and, if there is a difference between those amplitudes, correcting the difference; and a phase-rotator for rotating the phases of the first and second quadrature signals supplied from the AGC circuit.

Also according to the present invention, there is provided an AGC method for signals in a digital wireless communication systems using a quadrature modulation having a step of delaying either of two inputted quadrature signals, a step of comparing the amplitudes of the two quadrature signals, and a step of correcting, if there is a difference between those amplitudes, the difference.

As described above, the AGC circuits and the AGC method can properly correct amplitude deviations under whatever phasic condition signals may be inputted.

The reason is as follows: Usually, in a quadrature modulation as QAM, transmission is performed without allowing correlation between successive signals. Therefore, as the amplitudes of two quadrature signals are compared at different points of time, their amplitudes can be compared correctly.

For this reason, whatever the relationship between the carrier frequency of input IF signals and the frequency of the oscillator may be, any amplitude difference between two quadrature signals that may arise in the analog circuit section can be automatically detected and corrected.

DETAILED DESCRIPTION OF PREFERRED EMBODIMENTS

Preferred embodiments of the present invention will be described in detail below with reference to accompanying drawings.

Figure 1:
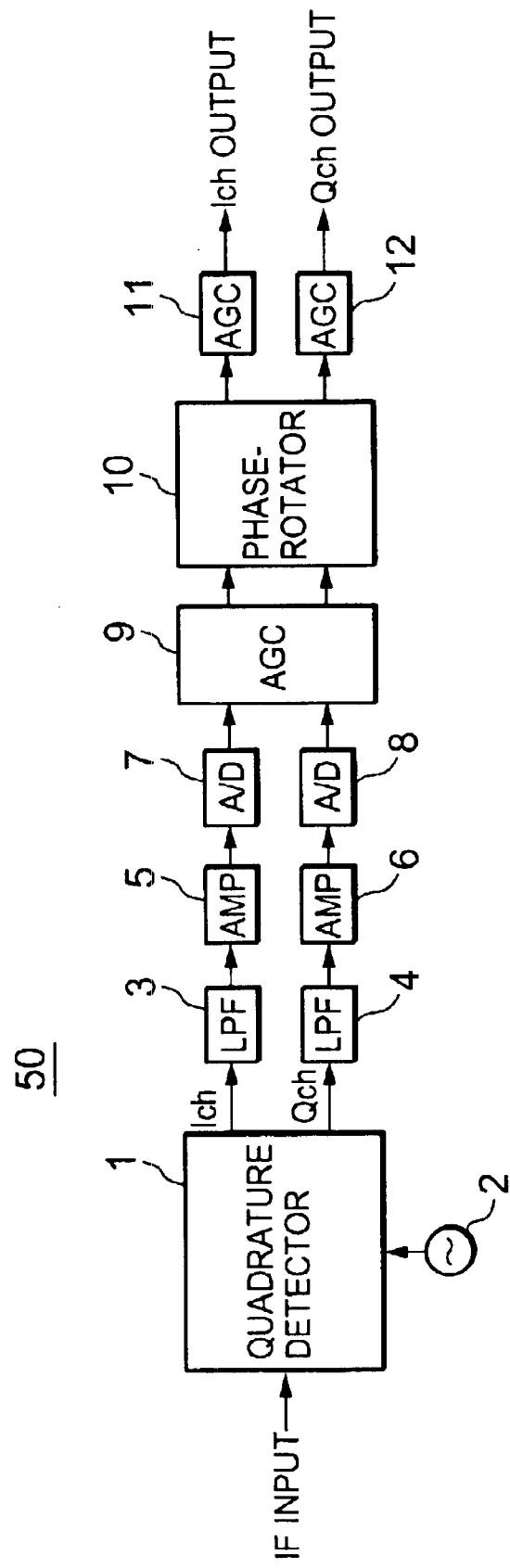
FIG. 1 is a block diagram illustrating the configuration of a demodulator according to the prior art.
Figure 2:
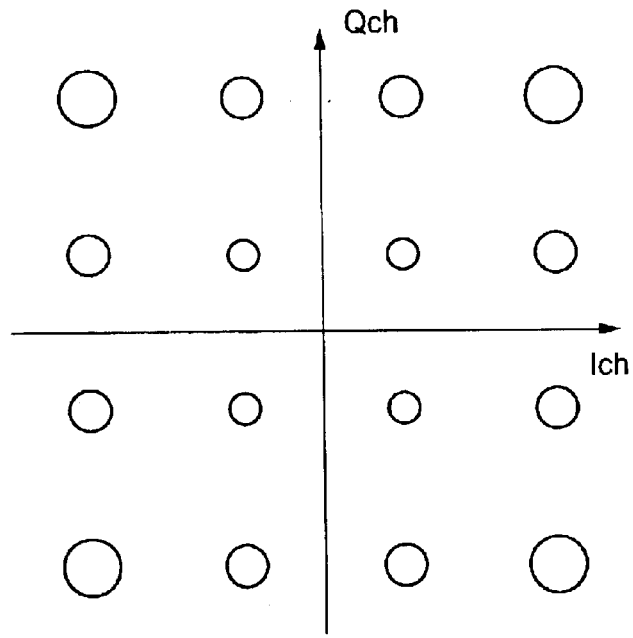
FIG. 2 is an I-Q plain showing the result of demodulation where there is a gain difference in an analog circuit.
Figure 3:
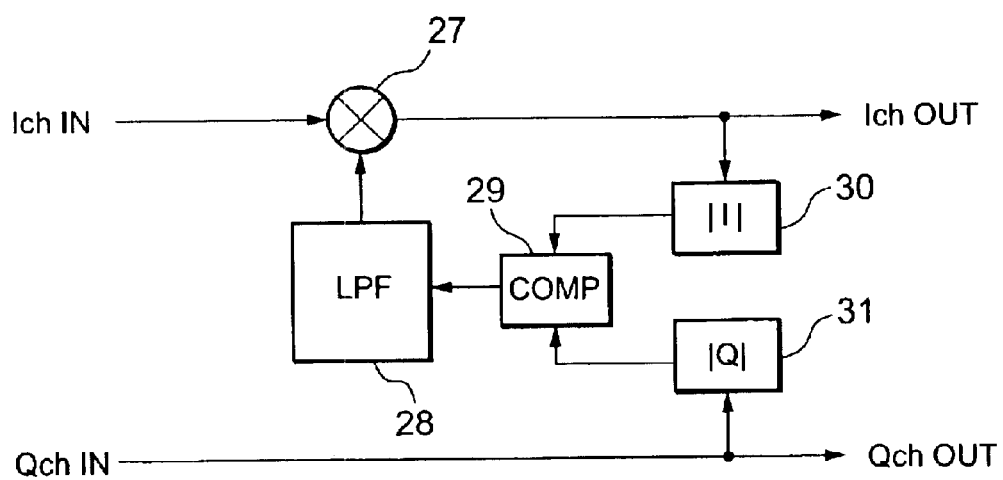
FIG. 3 is a block diagram illustrating the structure of an AGC circuit according to the prior art.
Figure 4:
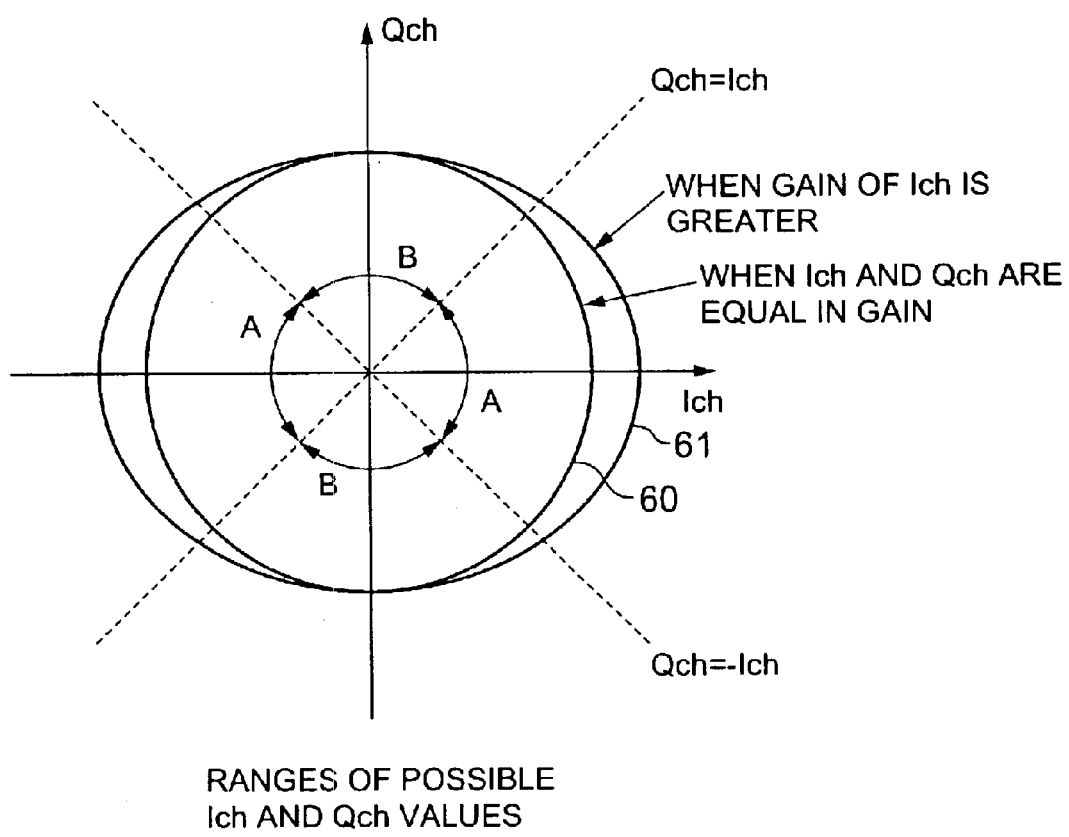
FIG. 4 is an I-Q plain for describing control by the AGC circuit shown in FIG. 3.
Figure 5:
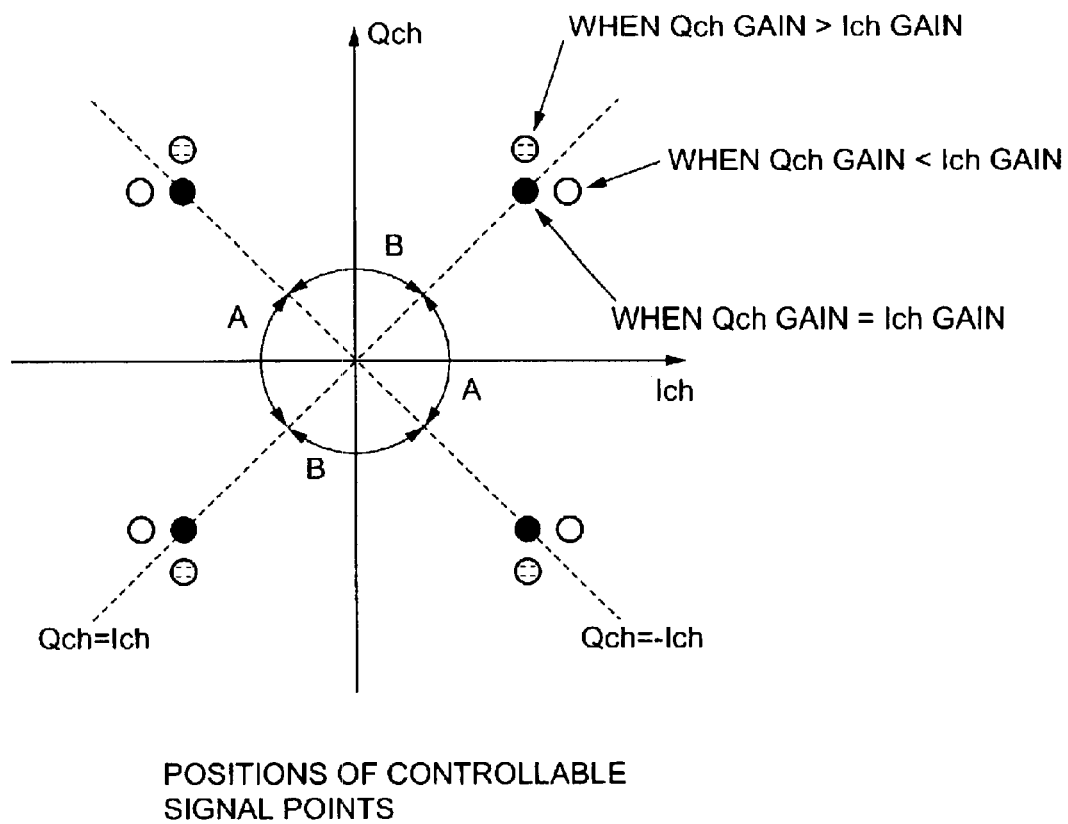
FIG. 5 is another I-Q plain for describing control by the AGC circuit shown in FIG. 3.
Figure 6:
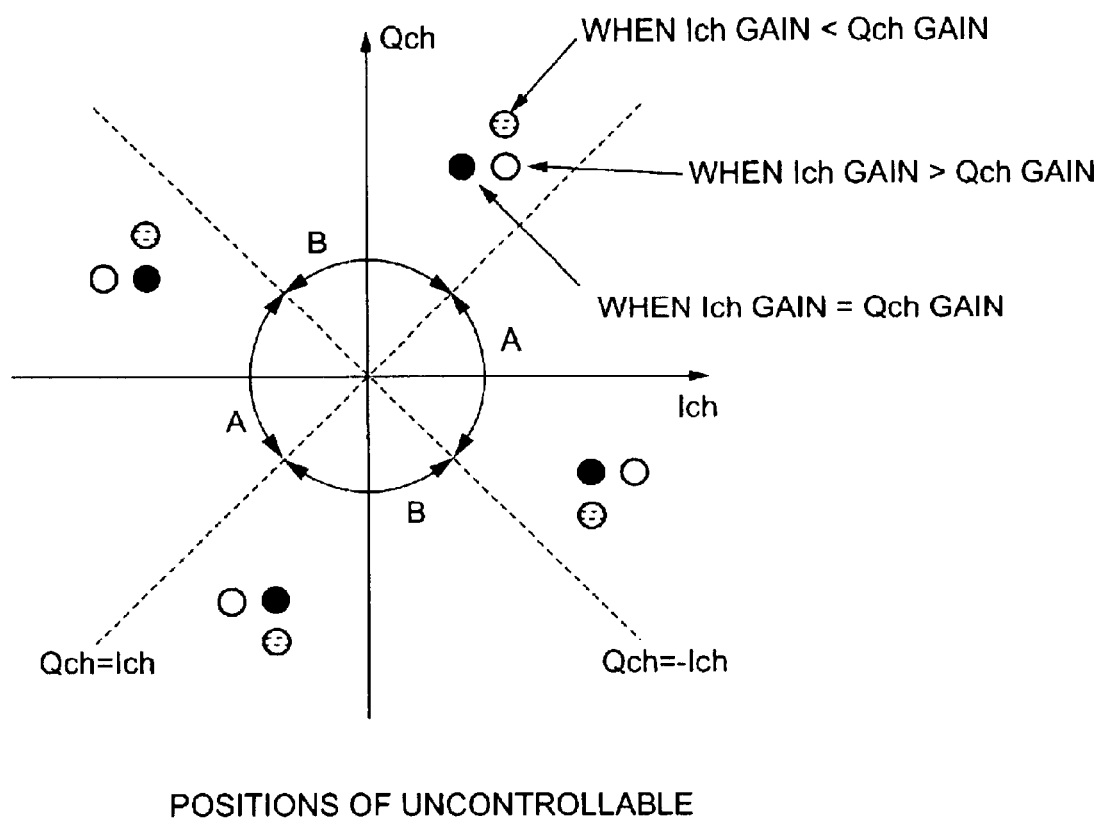
FIG. 6 is still another I-Q plain for describing control by the AGC circuit shown in FIG. 3.
Figure 7:
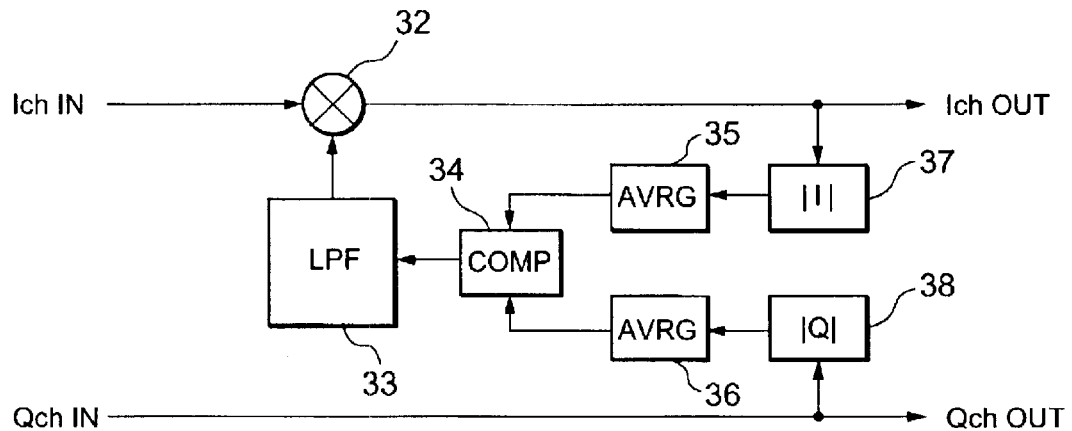
FIG. 7 is a block diagram illustrating the structure of another AGC circuit according to the prior art.
Figure 8:
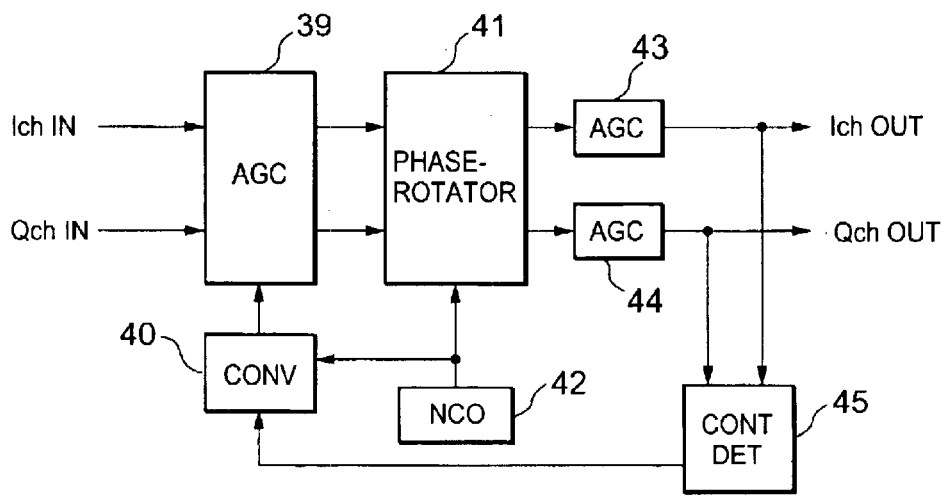
FIG. 8 is a block diagram illustrating the structure of a demodulator according to the prior art.
Figure 9:
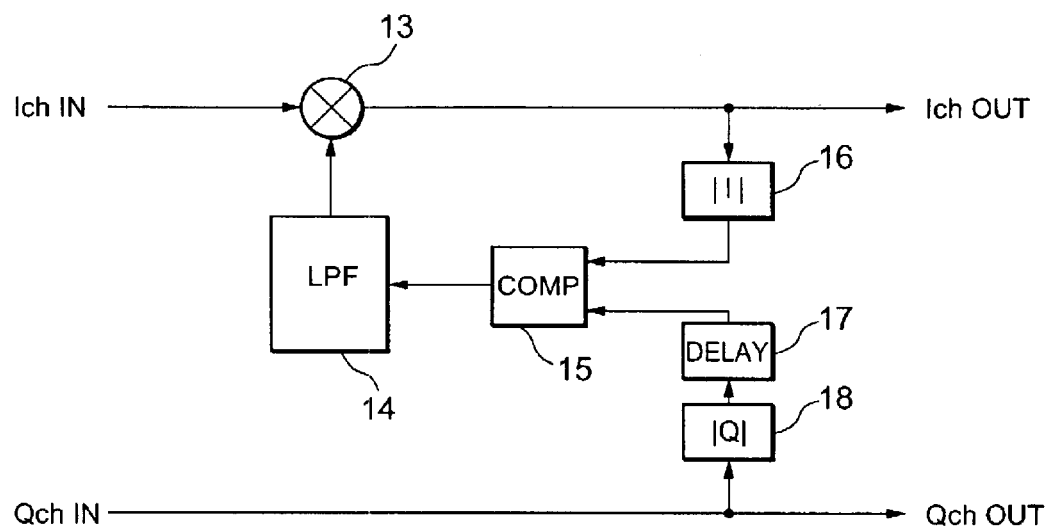
FIG. 9 is a block diagram of an AGC circuit, which is a preferred embodiment of the present invention.
Figure 10:
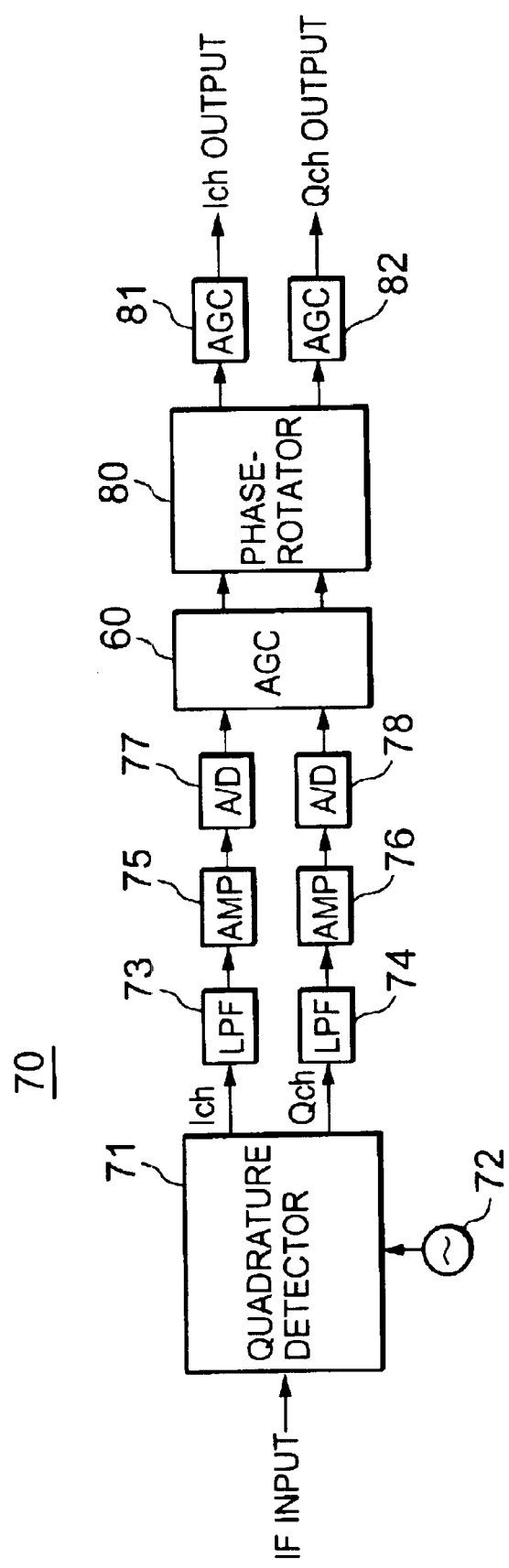
FIG. 10 is a block diagram of a demodulator to which the AGC circuit shown in FIG. 9 is applied.

FIG. 9 is a block diagram of an AGC circuit 60, which is a preferred embodiment of the invention. FIG. 10 is a block diagram illustrating the structure of a demodulator 70 incorporating the AGC circuit 60, which is this preferred embodiment of the invention. This demodulator 70 is a QAM demodulator.

The demodulator 70 consists of a quadrature detector 71 for converting inputted intermediate frequency (IF) signals of a modulated wave into two quadrature signals Ich and Qch; an oscillator 72 for transmitting periodical signals to the quadrature detector 71; low pass filters 73 and 74 for removing high frequency components from the output of the quadrature detector 71 and extracting required quadrature component signals; amplifiers 75 and 76 for amplifying the quadrature signals Ich and Qch supplied by the low pass filters 73 and 74 to amplitudes large enough for reception by analog-to-digital converters; analog-to-digital converters 77 and 78 for converting the two analog quadrature signals Ich and Qch into digital signals; the AGC circuit 60 which includes an automatic gain controller for controlling the amplitude of either one of the two quadrature signals Ich and Qch supplied by the analog-to-digital converters 77 and 78; a phase-rotator 80 for rotating the phases of the two quadrature signals Ich and Qch supplied by the AGC circuit 60; and amplitude adjustors 81 and 82 for adjusting the amplitudes of the two quadrature signals Ich and Qch supplied from the phase-rotator 80 to prescribed amplitudes.

The quadrature detector 71 has a function to convert inputted intermediate frequency signals (IF), which is QAM-modulated, into two quadrature component (baseband) signals Ich and Qch on the basis of input signals from the oscillator 72.

In this embodiment a quasi-synchronous detection is used. Unlike where a synchronous detection is used, the oscillator 72 merely oscillates at a frequency close to the carrier frequency of the intermediate frequency signals (IF) without being subject to control by any other element. Therefore the output of the oscillator 72 is not synchronized with the carrier frequency of the intermediate frequency signals (IF).

The low pass filters 73 and 74 have a function to extract only the required quadrature component signals Ich and Qch out of the output of the quadrature detector 71 containing various high frequency components and other noise elements.

The amplifiers 75 and 76 have a function to amplify the quadrature signals Ich and Qch supplied from the low pass filters 73 and 74 to amplitudes large enough for reception by the analog-to-digital converters 77 and 78. Although the amplifiers 75 and 76 into which the two quadrature signals Ich and Qch are respectively inputted have equal gains, the actual gains of the two amplifiers 75 and 76 usually differ more or less on account of fluctuations in element performance because the signals are processed by an analog operation.

The analog-to-digital converters 77 and 78 have a function to convert input analog signals into digital signals for subsequent processing, which is performed digitally.

The phase-rotator 80 rotates points indicated by the two quadrature signals Ich and Qch on the I-Q plain around the original.

The rotations are expressed in the following equations:

$$I_{out} = I_{in} \times \cos\theta - Q_{in} \times \sin\theta \tag{1}$$

$$Q_{out} = I_{in} \times \sin\theta + Q_{in} \times \cos\theta \tag{2}$$

where Iin and Qin are the Ich and Qch inputs to the phase-rotator 80, respectively, and Iout and Qout are the Ich and Qch outputs from the phase-rotator 80, respectively.

As θ, a value to cancel the frequency gap and the phase gap between the oscillator 72 and the carrier frequency of the intermediate frequency signals (IF) in the quadrature detector 71 is selected. As a result, the phase-rotator 80 outputs demodulated data whose carrier wave is synchronized.

The amplitude adjustors 81 and 82 automatically adjust the amplitudes of input signals to amplitudes required for output signals. The AGC circuit 60 has a function to compare the amplitudes of the inputted quadrature signals Ich and Qch. If there is a difference between the two amplitudes, the difference is corrected by multiplying the Ich input signal by a control value.

More specifically, the AGC circuit 60 includes a multiplier 13, a low pass filter 14, a comparator 15, first and second absolute value circuits 16 and 18, and a delay circuit 17 as shown in FIG. 9.

The multiplier 13 corrects the amplitude of the quadrature signal Ich by multiplying the Ich input signal by a correction signal supplied from the low pass filter 14.

The first absolute value circuit 16 figures out the absolute value, namely, the amplitude of the quadrature signal Ich supplied from the multiplier 13, while the second absolute value circuit 18 figures out the absolute value, namely, the amplitude of the quadrature signal Qch.

The delay circuit 17 is a circuit for delaying the output signal representing the amplitude of the quadrature signal Qch, figured out by the second absolute value circuit 18, by an equivalent of one symbol. The delay circuit 17 can be configured of, for instance, a flip-flop.

The comparator 15 compares the amplitude of the quadrature signal Ich supplied from the first absolute value circuit 16 and the amplitude of the quadrature signal Qch supplied from the delay circuit 17, and outputs the result of the comparison. In this embodiment of the invention, the comparator 15 is supposed to give "0" if the amplitude of the quadrature signal Ich is greater than the amplitude of the quadrature signal Qch or "1" if the amplitude of the quadrature signal Qch is greater than the amplitude of the quadrature signal Ich.

The low pass filter 14 removes high frequency component from the output signal of the comparator 15, and supplies the multiplier 13 with a correction signal for correcting the amplitude of the quadrature signal Ich.

In this preferred embodiment, the low pass filter 14 is configured of an up-down counter, which is counted up when the output of the comparator 15 is "1" or counted down when the output of the comparator 15 is "0".

Now the operation of the demodulator 70 shown in FIG. 10 will be described below.

The quadrature detector 71 extracts the two quadrature signals Ich and Qch out of the inputted intermediate frequency signals (IF), and transmits them to the low pass filters 73 and 74, respectively.

The amplifiers 75 and 76 amplify the two quadrature signals Ich and Qch from which high frequency components and other noise elements are removed by the low pass filters 73 and 74. The amplified two quadrature signals Ich and Qch are converted by the analog-to-digital converters 77 and 78 into digital signals.

It is ideal for the two quadrature signals Ich and Qch to pass circuits of exactly the same characteristics before they are converted by the analog-to-digital converters 77 and 78 into digital signals. However, the input units of the quadrature detector 71, the low pass filters 73 and 74, the amplifiers 75 and 76, and the analog-to-digital converters 77 and 78 are configured of analog circuits, therefore fluctuations in element performance and gain fluctuations due to temperature difference are inevitable, and accordingly it is impossible for the gains of the two quadrature signals Ich and Qch in the analog circuits to be equal.

Therefore, the amplitudes of the two quadrature signals Ich and Qch are already unequal at the time they are converted into digital signals by the analog-to-digital converters 77 and 78, and there is a difference in amplitude due to differences in gains in the analog circuits.

Only the quadrature signal Ich, out of the two quadrature signals Ich and Qch inputted into the AGC circuit 60, is multiplied by the output signal of the low pass filter 14, which is the correction signal. By the multiply a correction to eliminate the amplitude difference from the other quadrature signal Qch is undergone.

A specific example of corrective operation will be described below.

It is supposed here that the output of the low pass filter 14 is its initial value 1.0. As the output of the low pass filter 14 is 1.0, the quadrature signal Ich inputted into the AGC circuit 60 is outputted as it is to the first absolute value circuit 16 as the quadrature signal Qch would be.

The first and second absolute value circuits 16 and 18 figure out the absolute values, namely the amplitudes, of the two quadrature signals Ich and Qch, respectively.

The output side of the second absolute value circuit 18 into which the quadrature signal Qch is inputted is connected to the delay circuit 17, and the signal representing the amplitude of the quadrature signal Qch is delayed by the delay circuit 17 by an equivalent of one symbol.

Both the output signal of the first absolute value circuit 16 into which the quadrature signal Ich has been inputted and the output signal of the delay circuit 17 are supplied to the comparator 15, and the comparator 15 compares the amplitudes of the two quadrature signals Ich and Qch. The result of comparison is supplied to the low pass filter 14.

If the comparator 15 judges that the amplitude of the quadrature signal Ich is greater than the amplitude of the quadrature signal Qch, the comparator 15 supplies as a decision signal a signal "0" for reducing the output of the low pass filter 14. By the reducing the amplitude of the quadrature signal Ich is restrained.

Conversely, if the comparator 15 judges that the amplitude of the quadrature signal Ich is smaller than the amplitude of the quadrature signal Qch, the comparator 15 supplies as a decision signal a signal "1" for increasing the output of the low pass filter 14. By the increasing the amplitude of the quadrature signal Ich is increased.

The signal "0" or "1" supplied from the comparator 15 is outputted into the low pass filter 14 as described above.

As the decision signal "1" is supplied from the comparator 15 when the amplitude of the quadrature signal Ich is judged to be smaller than the amplitude of the quadrature signal Qch, the up-down counter in the low pass filter 14 is counted up by one.

When the gain of the quadrature signal Ich in the analog section is less than that of the quadrature signal Qch and the amplitude of the quadrature signal Ich is smaller than that of the quadrature signal Qch, the proportion of the decision signal "1" indicating that the amplitude of the quadrature signal Ich is smaller than the amplitude of the quadrature signal Qch becomes greater, and the counter in the low pass filter 14 is gradually counted up. As a result, the output of the low pass filter 14 becomes greater. The output of the low pass filter 14 constitutes a control signal and multiplying the inputted quadrature signal Ich by this control signal results in correction of the amplitude of the quadrature signal Ich.

This operation is continued until the corrected amplitude of the quadrature signal Ich and the amplitude of the quadrature signal Qch become equal to each other, and control is so effected that the amplitudes of the two quadrature signals Ich and Qch supplied from the AGC circuit 60 eventually become equal.

Figure 11:
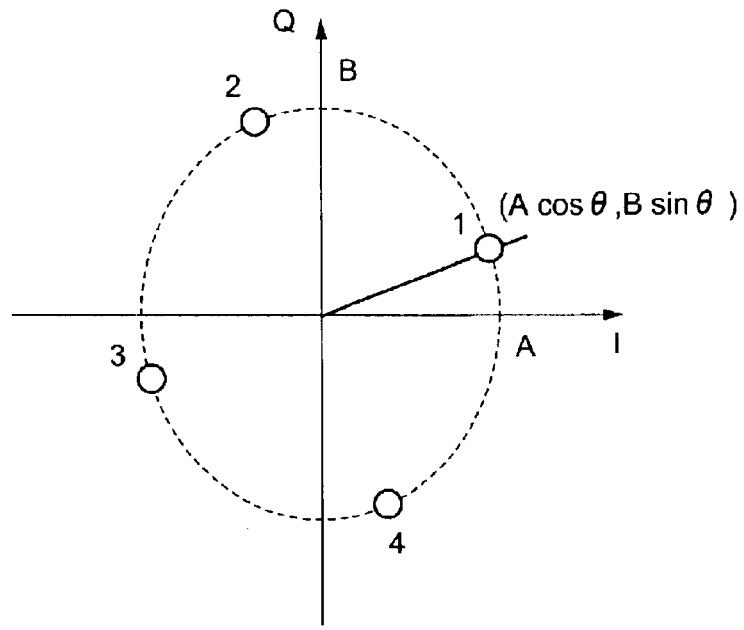
FIG. 11 is an I-Q plain for describing control by the AGC circuit shown in FIG. 9.

Next, in order to demonstrate that proper control is performed by the AGC circuit 60 which is this embodiment of the invention, there is supposed a situation illustrated in FIG. 11 with respect to a QPSK operation.

With the gain of one quadrature signal Ich being represented by A, that of the other quadrature signal Qch by B, and the coordinates of Point 1 by (I, Q)=(A cos θ, B sin θ), the coordinates of other points will be represented as follows:

$$\text{Point 1: } (I, Q)=(A \cos \theta, B \sin \theta) \quad (3)$$

$$\text{Point 2: } (I, Q)=(A \cos(\theta+\pi/2), B \sin(\theta+\pi/2)) \quad (4)$$

$$\text{Point 3: } (I, Q)=(A \cos(\theta+\pi), B \sin(\theta+\pi)) \quad (5)$$

$$\text{Point 4: } (I, Q)=(A \cos(\theta+3\pi/2), B \sin(\theta+3\pi/2)) \quad (6)$$

Equation (3) represents the coordinates of Point 1; Equation (4), Point 2; Equation (5), Point 3; and Equation (6), Point 4, all in FIG. 11.

If the current point is Point 1, the absolute value Iabs of the quadrature signal Ich figured out by the first absolute value circuit 16 will be represented by:

$$I_{abs}=A|\cos \theta| \quad (7)$$

Further, as the signal point immediately before may take any of the signal points represented by Equations (3)

through (6), the absolute value Qabs of the quadrature signal Qch having been outputted from the delay circuit 17 can have the following variety of four:

$$Qabs = B|\sin\theta| \qquad (8)$$
$$= B|\sin(\theta + \pi/2)| = B|\cos\theta| \qquad (9)$$
$$= B|\sin(\theta + \pi)| = B|\sin\theta| \qquad (10)$$
$$= B|\sin(\theta + 3\pi/2)| = B|\cos\theta| \qquad (11)$$

Figure 12:
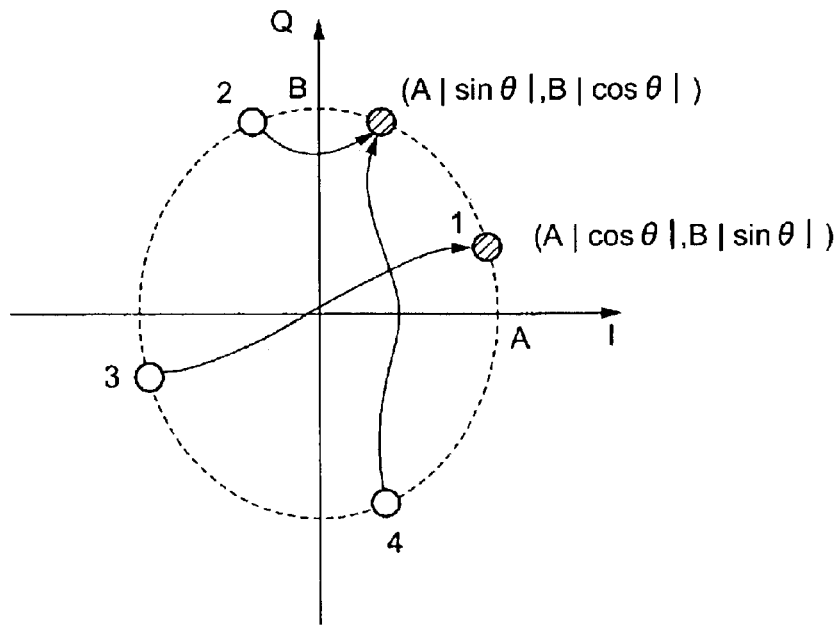
FIG. 12 is another I-Q plain for describing control by the AGC circuit shown in FIG. 9.

As shown in FIG. 12, Equation (8) and Equation (10) are projected on the same point, and so are Equation (9) and Equation (11) Therefore, the difference in absolute value between the current signal point Ich and the immediately preceding signal point Qch can be either one of the following two:

$$Iabs-Qabs=A|\cos\theta|-B|\cos\theta| \qquad (12)$$

or $$Iabs-Qabs=A|\cos\theta|-B|\sin\theta| \qquad (13)$$

Here, Equation (12) concerns projection of two points on different points, while Equation (13) concerns projection of two points on the same point.

Since signal points are transmitted at random, the probabilities of the occurrence of the two above-cited equations, (12) and (13), are equal.

Figure 13:
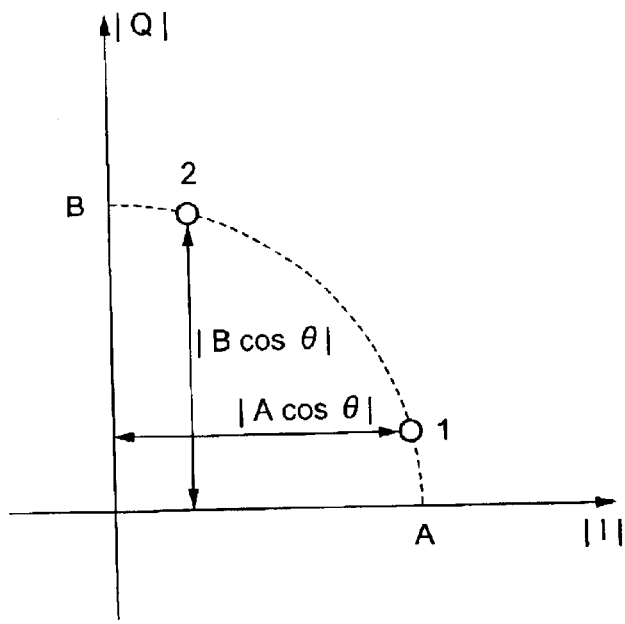
FIG. 13 is still another I-Q plain for describing control by the AGC circuit shown in FIG. 9.

Equation (12), as shown in FIG. 13, compares the amplitudes of Ich at Point 2 and of Qch at Point 1 when two points are projected on the two different points, Point 1 and Point 2. Since this Equation (12) can be rewritten into:

$$A|\cos\theta|-B|\cos\theta|=(A-B)|\cos\theta|$$

the amplitude difference between Ich and Qch can be figured out all the time in the range of $0\leq\theta<\pi/2$.

Further, the case of $\theta=\pi/2$ is equivalent to the case of $\theta=0$.

On the other hand, Equation (13) is applied in the case that projection of the respective absolute values of the current point and that of the immediately preceding points are on the same point. This case can be considered as described below.

Figure 14:
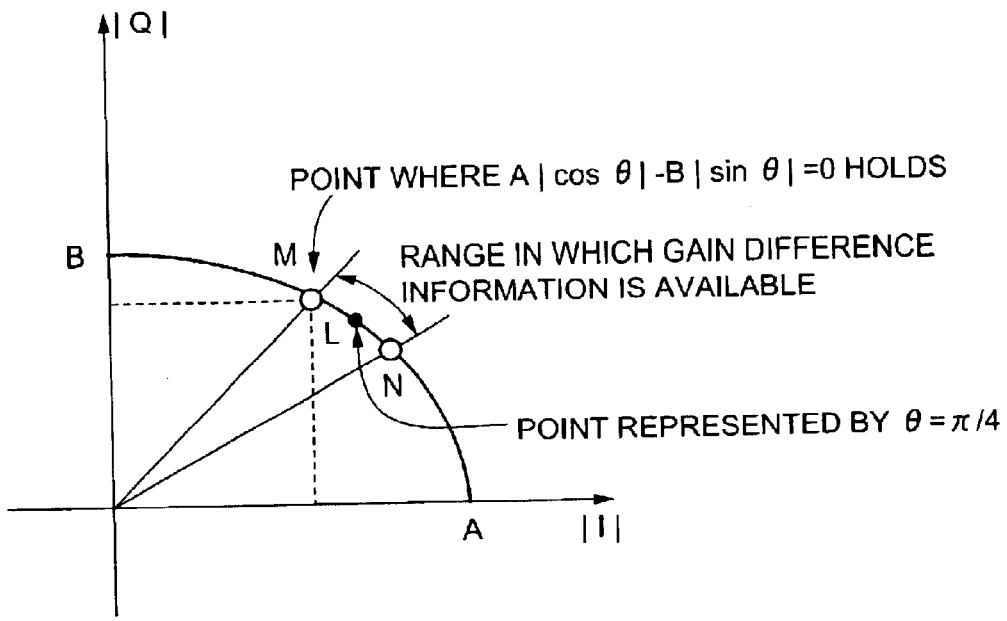
FIG. 14 is yet another I-Q plain for describing control by the AGC circuit shown in FIG. 9.

If it is supposed here that the gain of the quadrature signal Ich is greater than that of the quadrature signal Qch, that is A>B, Point M where the amplitudes of Ich and Qch become equal will be present at the position that is a little away from the point represented by $\theta=\pi/4$ as shown in FIG. 14. At this point M, Iabs−Qabs=0 holds.

With this Point M as the boundary, (Iabs−Qabs) will be always negative in the counterclockwise region and positive in the clockwise region. If a receive signal point is entered at Point M, on the I−Q plain there will be Point N where $\theta$ is $\pi/2$ away from the point on which Point M is projected.

Point M and Point N exist with Point L represented by $\theta=\pi/4$ between them, and Point M and Point N overlap each other at Point L when A=B.

If the point at which absolute value of the reception point is taken is positioned between Point M and Point N, the other signal point will always be between Point M and Point N.

In this case, therefore, it is determined that Ich is always greater than Qch. As the difference between A and B becomes small, the region between Point M and Point N will become smaller and disappear at A=B, this region can have no adverse effect on the control.

If the absolute value of a receive signal at a given point of time is farther than Point M in the counterclockwise direction, the other point will always be farther than Point N in the clockwise direction. Therefore the number of the points entering the respective regions will become equal if the receive signal is random. As the ratio of outputs of the information that Ich is greater than Qch and that of outputs of the information that Ich is smaller than Qch result in an equal ratio, eventually effects are cancelled at the low pass filter 14.

Accordingly, where two points differing in time are projected on the same point, control is not affected unless $\theta$ is in the vicinity of $\pi/2$ and, if $\theta$ is close to $\pi/2$, an effective comparison result for control can be supplied.

The same explanation also holds in the case of A<B. If $\theta$ is not in the vicinity of $\pi/2$, control will not be affected and, if $\theta$ is close to $\pi/2$, an effective comparison result for control can be supplied.

As described above, whereas Equation (12) always provides effective control information and Equation (13) supplies effective information under a prescribed condition and does not affect control under other conditions, in an overall evaluation, in whatever position $\theta$ may be, the AGC circuit 60, which is this embodiment of the invention, can correctly control any amplitude error with respect to (Iabs−Qabs).

As hitherto described, the AGC circuit 60 embodying the present invention can provide the following advantages.

A first advantage is that correct control can be accomplished even when the carrier frequency of the input IF signals and the frequency of the oscillator 72 are the same.

The reason is that data of the two quadrature signals Ich and Qch at different points of time are used for control.

A second benefit is that integration and size reduction are possible.

The reason is that the circuit configuration is relatively simple and everything is digitally processed.

To add, although the delay circuit 17 delays data of the quadrature signal Qch by an equivalent of one symbol in the demodulator 70 shown in FIG. 10, it is also acceptable to delay the signal Qch by an equivalent of N symbols (N is 2 or any larger positive integer) because the point is that data of Ich and Qch at the same point of time are not used.

Or it is also permissible to delay data of the quadrature signal Ich, in place of the quadrature signal Qch, by an equivalent, of one symbol or N symbols.

What is claimed is:

1. An automatic gain control circuit for digital wireless communication systems using a quadrature modulation, which:

compares amplitudes of two quadrature signals at mutually different points of time and, if there is a difference between those amplitudes, corrects the difference.

2. An automatic gain control circuit having:

a multiplier for multiplying a first quadrature signal by a signal supplied from a low pass filter, a first absolute value circuit for figuring out an amplitude of the signal supplied from said multiplier, a second absolute value circuit for figuring out an amplitude of a second quadrature signal, a delay circuit for delaying an output signal from said second absolute value circuit by at least an equivalent of one symbol, a comparator for comparing an output signal from said first absolute value circuit and an output signal from said delay circuit, and said low pass filter for removing high frequency components from an output signal of said comparator.

3. The automatic gain control circuit, as claimed in claim 2, wherein:

said delay circuit includes a flip-flop circuit.

4. The automatic gain control circuit, as claimed in claim 2, wherein:
said low pass filter is provided with an up-down counter, which counts up or down its count according to an output from said comparator.

5. The automatic gain control circuit, as claimed in claim 3, wherein:
said low pass filter is provided with an up-down counter, which counts up or down its count according to an output from said comparator.

6. A demodulator having:
a quadrature detector for converting inputted intermediate frequency signals into first and second quadrature signals,
an analog-to-digital converter for converting said first and second quadrature signals into digital signals,
an automatic gain control circuit for comparing at mutually different points of time amplitudes of first and second quadrature signals supplied from said analog-to-digital converter and, if there is a difference between those amplitudes, correcting the difference, and
a phase-rotator for rotating phases of the first and second quadrature signals supplied from said automatic gain control circuit.

7. The demodulator, as claimed in claim 6, wherein said automatic gain control circuit has:
a multiplier for multiplying a first quadrature signal by a signal supplied from a low pass filter,
a first absolute value circuit for figuring out an amplitude of the signal supplied from said multiplier,
a second absolute value circuit for figuring out the amplitude of a second quadrature signal,
a delay circuit for delaying an output signal from said second absolute value circuit by at least an equivalent of one symbol,
a comparator for comparing an output signal from said first absolute value circuit and an output signal from said delay circuit, and
said low pass filter for removing high frequency components from an output signal of said comparator.

8. The demodulator, as claimed in claim 7, wherein:
said delay circuit includes a flip-flop circuit.

9. The demodulator, as claimed in claim 7, wherein:
said low pass filter is provided with an up-down counter, which counts up or down its count according to an output from said comparator.

10. The demodulator, as claimed in claim 8;
said low pass filter is provided with an up-down counter, which counts up or down its count according to an output from said comparator.

11. An automatic gain control method for signals in a digital wireless communication system using a quadrature modulation having a step of delaying either of two quadrature signals, a step of comparing amplitudes of said two quadrature signals, and a step of correcting, if there is a difference between those amplitudes, the difference.

* * * * *